(12) United States Patent
Ohsawa et al.

(10) Patent No.: US 10,678,306 B2
(45) Date of Patent: Jun. 9, 2020

(54) VIEWING ANGLE CHANGING FILM

(71) Applicant: LENOVO (SINGAPORE) PTE. LTD., Singapore (SG)

(72) Inventors: Osamu Ohsawa, Kanagawa (JP); Takehito Yamauchi, Kanagawa (JP); Shinichi Kubota, Kanagawa (JP); Hiroyuki Noguchi, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 257 days.

(21) Appl. No.: 15/932,977

(22) Filed: Jun. 4, 2018

(65) Prior Publication Data

US 2019/0086967 A1    Mar. 21, 2019

(30) Foreign Application Priority Data

May 25, 2017    (JP) ................................. 2017-103734

(51) Int. Cl.
*G06F 1/16* (2006.01)

(52) U.S. Cl.
CPC .......... *G06F 1/1656* (2013.01); *G06F 1/1637* (2013.01); *G02B 2207/123* (2013.01)

(58) Field of Classification Search
CPC ....... G06F 1/1656; G06F 1/1637; G02B 5/00; G02B 2207/123
See application file for complete search history.

(56) References Cited

U.S. PATENT DOCUMENTS

2010/0075102 A1    3/2010    Lev et al.
2013/0156999 A1    6/2013    Braesch et al.

FOREIGN PATENT DOCUMENTS

| JP | 3062946 U | 10/1999 |
|---|---|---|
| JP | 2003-043934 A | 2/2003 |
| JP | 2003-058066 | 2/2003 |
| JP | 2004-264796 | 9/2004 |
| JP | 2012-113951 | 6/2012 |
| JP | 2014-215450 | 11/2014 |

*Primary Examiner* — Wen Huang
(74) *Attorney, Agent, or Firm* — Antony P. Ng; Russell Ng PLLC (57) ABSTRACT

A viewing angle changing film capable of changing the viewing angle of a display panel is provided. The viewing angle changing film includes a base film opposed to a display panel, and an attachment having a thickness smaller than a thickness of the base film. The base film can change the viewing angle of the display panel. The attachment is inserted into air gap defined between the display panel and a bezel. The attachment is a separate member from the base film, and is fixed to the base film.

15 Claims, 9 Drawing Sheets

VIEWING ANGLE CHANGING FILM

PRIORITY CLAIM

The present application claims benefit of priority under 35 U.S.C. §§ 120, 365 to the previously filed Japanese Patent Application No. JP2017-103734 with a priority date of May 25, 2017, which is incorporated by reference herein.

TECHNICAL FIELD

The present invention relates to viewing angle changing films in general, and in particular to a viewing angle changing film to be attached to a display panel of an electronic apparatus.

BACKGROUND

Films to be attached to a display panel of an electronic apparatus have been widely used. A protective film for protecting a display panel of a laptop personal computer (PC), for example, has an insertion edge having a smaller thickness than the other part. Such an insertion edge is inserted into a gap between the display panel and a bezel of the laptop PC, so that the protective film is opposed to the display panel.

A protective film, however, may increase the manufacturing cost because the film is formed or processed so as to have a partially thin part. The overall thickness of the viewing angle changing film may be reduced so that the end can be inserted into a gap between the display panel and the bezel. Such a film may fail to implement the correct function of changing the viewing angle.

Consequently, it would be preferable to provide an improved protective film.

SUMMARY

In accordance with an embodiment of the present disclosure, a protective film includes a based file and an attachment film. The base film changes a viewing angle of a display panel on which the protective film is placed. The attachment film, which is fixed to the base film, includes a set of attachements inserted into an air gap defined between the display panel and a bezel covering an outer edge of the display panel. The attachments are thinner than the base film.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
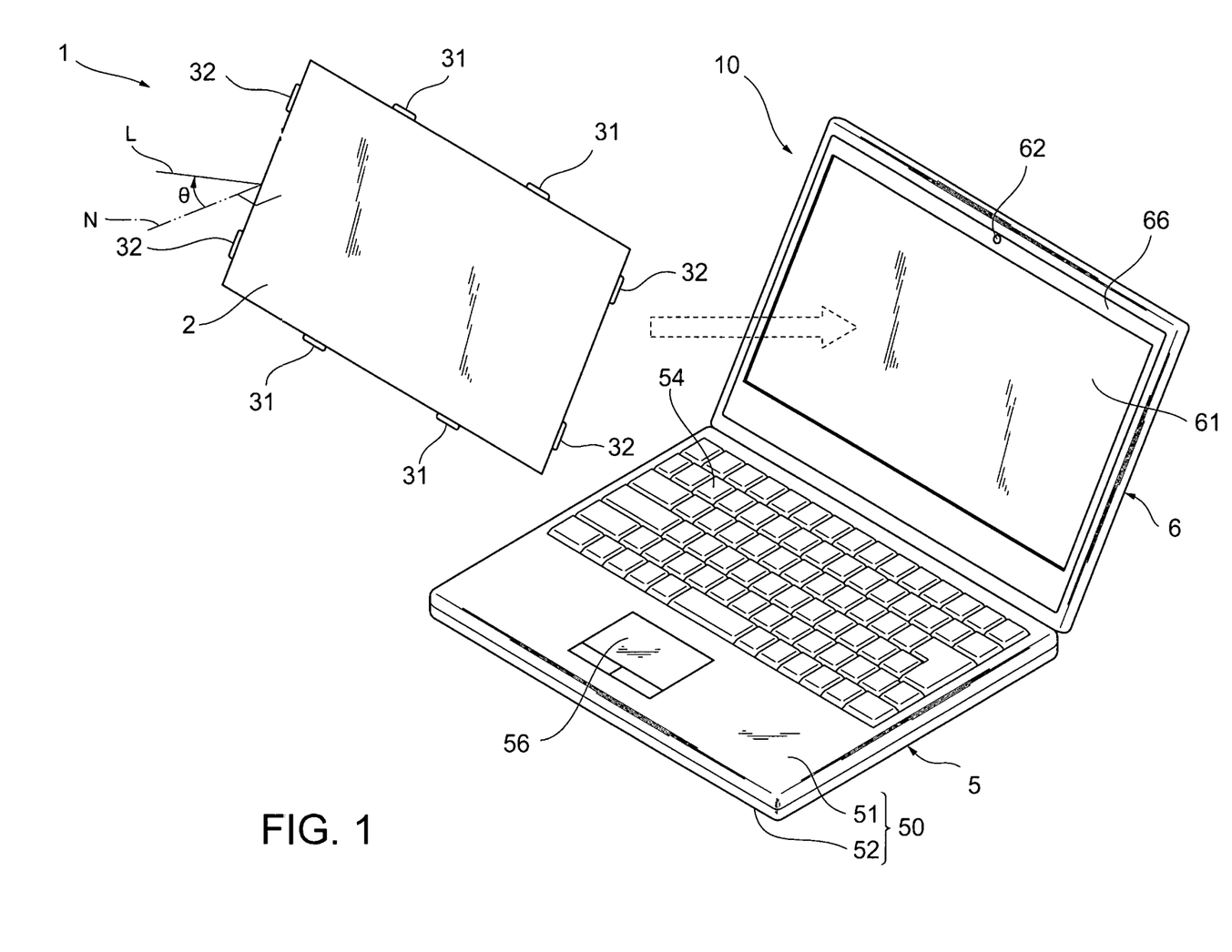
FIG. 1 is a perspective view of a viewing angle changing film and a laptop PC, according to a first embodiment.

Referring to FIG. 1, the following briefly describes a viewing angle changing film 1 and a laptop PC 10 according to a first embodiment. FIG. 1 is a perspective view of the viewing angle changing film 1 and the laptop PC 10. The laptop PC 10 includes a body 5 and a lid 6.

The body 5 includes a chassis 50 having a flattened box shape. The chassis 50 includes an upper cover 51 and a lower cover 52 that are opposed and attached. The chassis 50 internally stores a board (not illustrated), a CPU, a memory, a HDD or a SDD, and a battery, for example. The chassis 50 includes an input means, such as a keyboard 54 and a touch pad 56, on the upper cover 51.

The lid 6 is connected to the rear end of the body 5 via a hinge, and is openable/closable relative to the body 5. The lid 6 includes a LCD module 61, a camera lens 62 and a bezel 66.

The LCD module 61 is an example of the display panel, and displays various types of information in accordance with a control signal received from a graphics controller, for example. The LCD module 61 has a rectangular outer shape in the front view.

The bezel 66 is a rectangular frame, through which the LCD module 61 is exposed. The camera lens 62 is one element of a camera as an imaging device, and the camera lens is disposed at a substantially center of the bezel 66 in the width direction.

The viewing angle changing film 1 is attached to the laptop PC 10. As described later, the viewing angle changing film 1 has a function of changing the viewing angle of the LCD module 61. The viewing angle is an angle that the line of sight of a user forms with the LCD module 61, and is a range where the user can view the contents displayed on the LCD module 61. The viewing angle changing film 1 is attached to cover the LCD module 61. A user of the laptop PC 10 views the contents displayed on the LCD module 61 through this viewing angle changing film 1.

Figure 2:
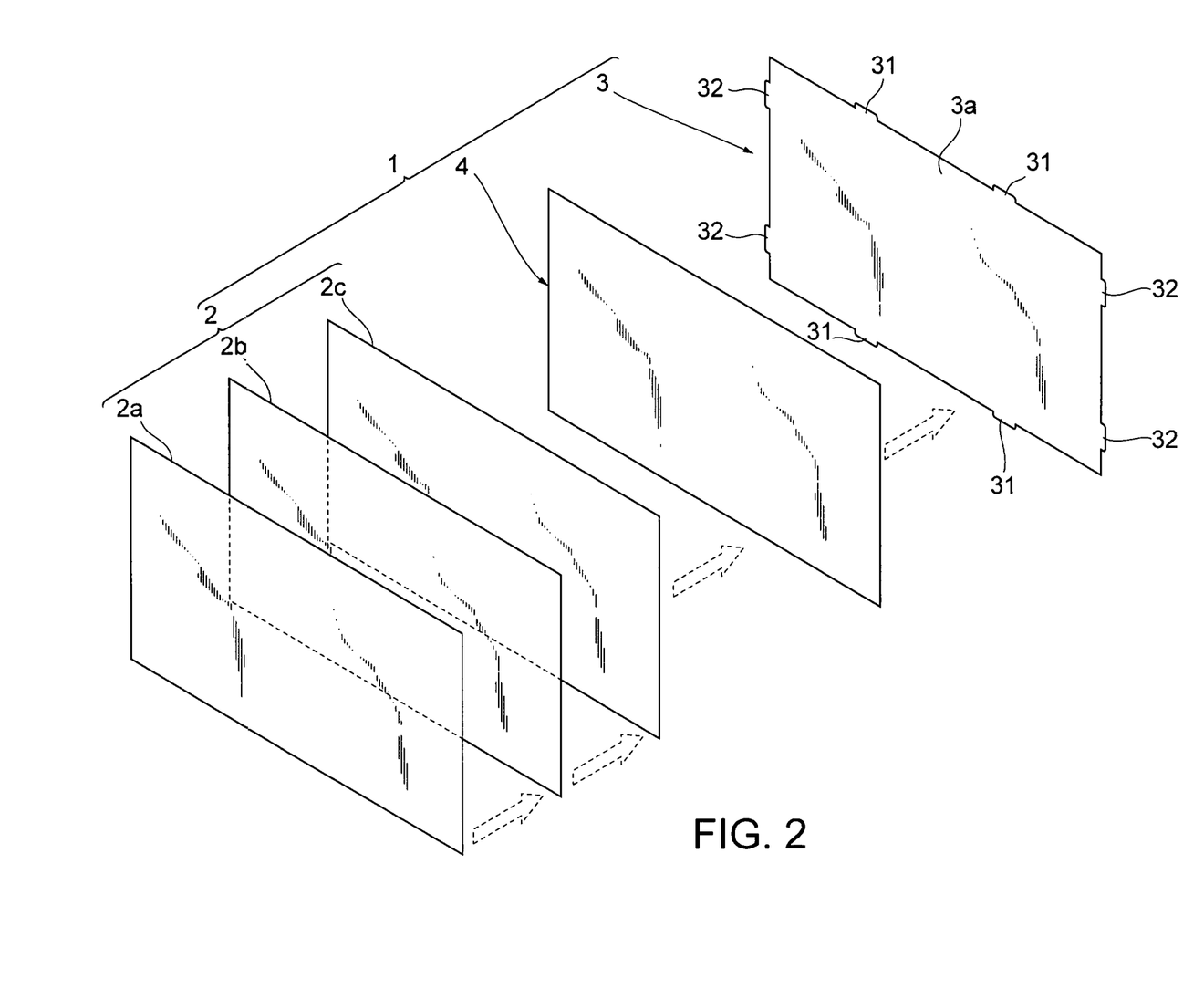
FIG. 2 is an exploded view of the viewing angle changing film of FIG. 1.

Referring next to FIG. 2, the following describes the structure of the viewing angle changing film 1. FIG. 2 is an exploded view of the viewing angle changing film. The viewing angle changing film 1 includes a base film 2, an attachment film 3, and optical adhesive 4.

The base film 2 is a member of changing the viewing angle. The base film 2 has the rectangular outer shape in the front view, and has substantially same dimensions as the inside of the frame of the bezel 66 (see FIG. 1). The base film 2 has a thickness of about 0.35 mm.

The base film 2 includes the lamination of a surface protective film 2a, a functional film 2b and a rear-face protective film 2c. The surface protective film 2a and the rear-face protective film 2c are made of flexible thermoplastic resin having a property of transmitting visible light, such as polyethylene terephthalate, polystyrene, polypropylene, and acryl, as a base material. The surface protective film 2a and the rear-face protective film 2c protect the functional film 2b by sandwiching it therebetween and ensure the rigidity of the base film 2. The functional film 2b internally has a set of louvers (not illustrated). These louvers are formed like ribs that extend linearly, and are made of a material having a property of not transmitting visible light. The set of louvers are disposed to be parallel to each other while having a distance therebetween, and an intermediate material (not illustrated) is disposed between these louvers. The intermediate material has a property of transmitting visible light and has adhesiveness. The surface protective film 2a and the rear-face protective film 2c adhere to one side face and the other side face of the functional film 2b, respectively, due to the adhesiveness of the intermediate material. Such a configuration of the functional film 2b transmits light only in the direction not shielded by the louvers.

The attachment film 3 is to attach the viewing angle changing film 1. The base film 2 is stacked on this attachment film 3. The attachment film 3 is made of flexible thermoplastic resin having a property of transmitting visible light, such as polyethylene terephthalate, polystyrene, polypropylene, and acryl, as a base material. The attachment film 3 includes a rectangular part 3a and a set of attachments 31, 32.

The rectangular part 3a has a rectangular outer shape in the front view. The dimensions of the rectangular part 3a in the vertical and horizontal directions are substantially the same as those of the base film 2.

The attachments 31, 32 are protrusions disposed at the end of the attachment film 3. The attachments 31, 32 protrude outwardly from the end of the rectangular part 3a. That is, the outer shape of the attachment film 3 is larger than the outer shape of the base film 2 by the attachments 31, 32.

Two of the attachments 31 are disposed along each long side of the rectangular part 3a, and the attachments 32 are disposed along each short side of the rectangular part 3a. The attachments 31, 31 are disposed having an interval therebetween and are offset from the center of the long side of the rectangular part 3a. The attachments 32, 32 also are disposed having an interval therebetween. Three or more of the attachments 31 may be disposed along the long side of the rectangular part 3a, or three or more of the attachments 32 may be disposed along the short side of the rectangular part 3a.

Such an attachment film 3 having the rectangular part 3a and the attachments 31, 32 is formed by stamping of a thin-film like material having a uniform thickness in the thickness direction. Therefore, the rectangular part 3a and the attachments 31, 32 are formed integrally, and they have the same thickness. Specifically the attachment film 3 has a uniform thickness of about 0.15 mm. That is, the thickness of the attachment film 3 is smaller than the thickness (about 0.35 mm) of the base film 2.

The optical adhesive 4 may be called Optically Clear Adhesive (OCA) or Optically Clear Resin (OCR) as well, and is a thin-film like member having a property of transmitting visible light. The optical adhesive 4 has a rectangular outer shape in the front view. The dimensions of the optical adhesive 4 in the vertical and horizontal directions are substantially the same as those of the base film 2. The optical adhesive 4 has a uniform thickness of about 0.05 mm. That is, the thickness of the optical adhesive 4 is smaller than the thickness (about 0.35 mm) of the base film 2 and the thickness (about 0.15 mm) of the attachment film 3.

The optical adhesive 4 is disposed between the base film 2 and the attachment film 3. The optical adhesive 4 adheres to the base film 2 on one side face and adheres to the attachment film 3 on the other side face. That is, the base film 2 adheres to the attachment film 3 via the optical adhesive 4.

As described above, the base film 2, the rectangular part 3a of the attachment film 3, and the optical adhesive 4 have substantially the same dimensions in their vertical and horizontal directions. The base film 2, the rectangular part 3a of the attachment film 3, and the optical adhesive 4 are disposed so that their outer lines coincide with each other in the front view. That is, the base film 2 substantially as a whole is fixed to the attachment film 3 via the optical adhesive 4. The attachments 31, 32 of the attachment film 3 are located outside of the end of the base film 2 fixed to the attachment film 3 (see FIG. 1).

Figure 3:
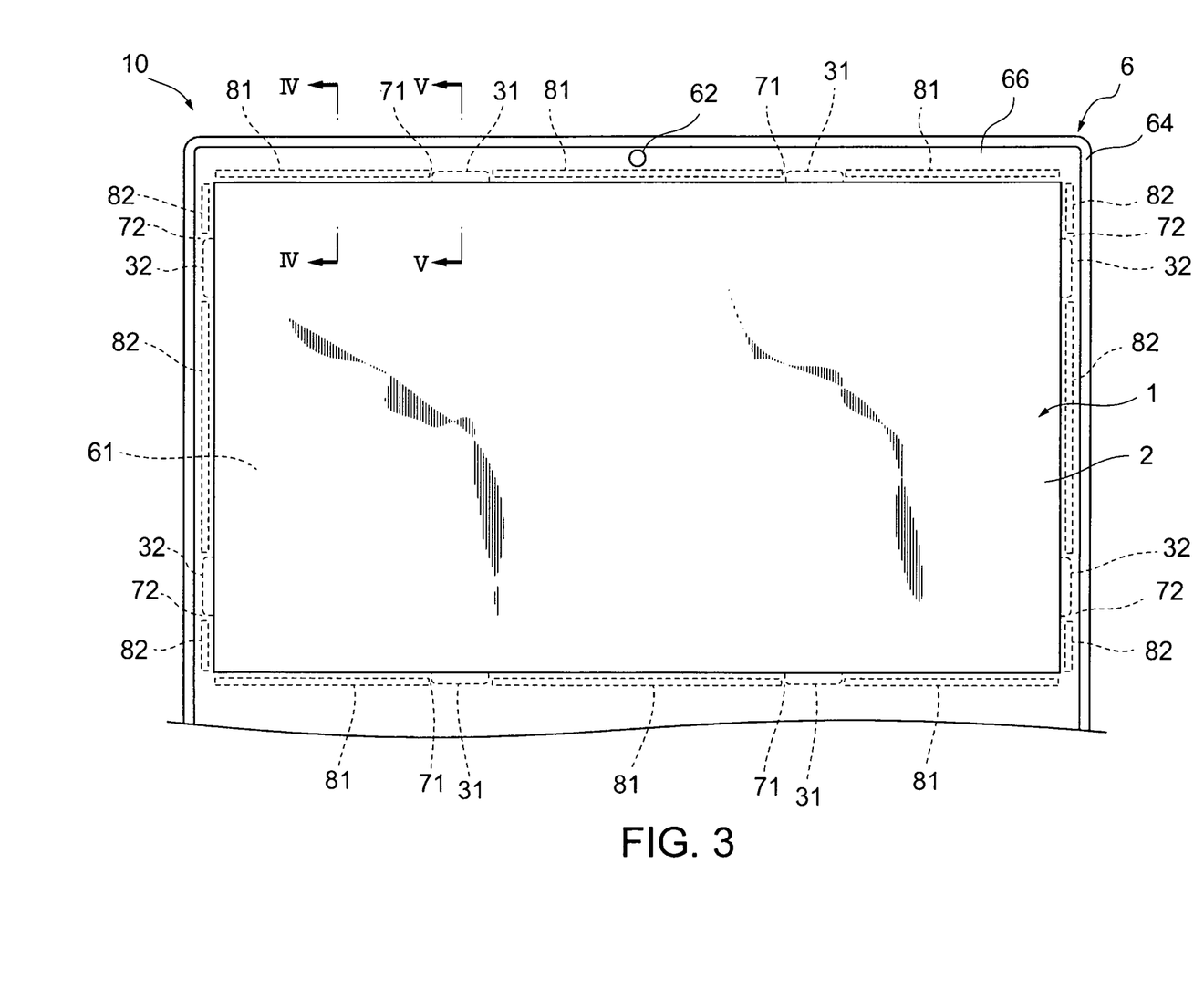
FIG. 3 is a front view of the viewing angle changing film and the laptop PC of FIG. 1.
Figure 4:
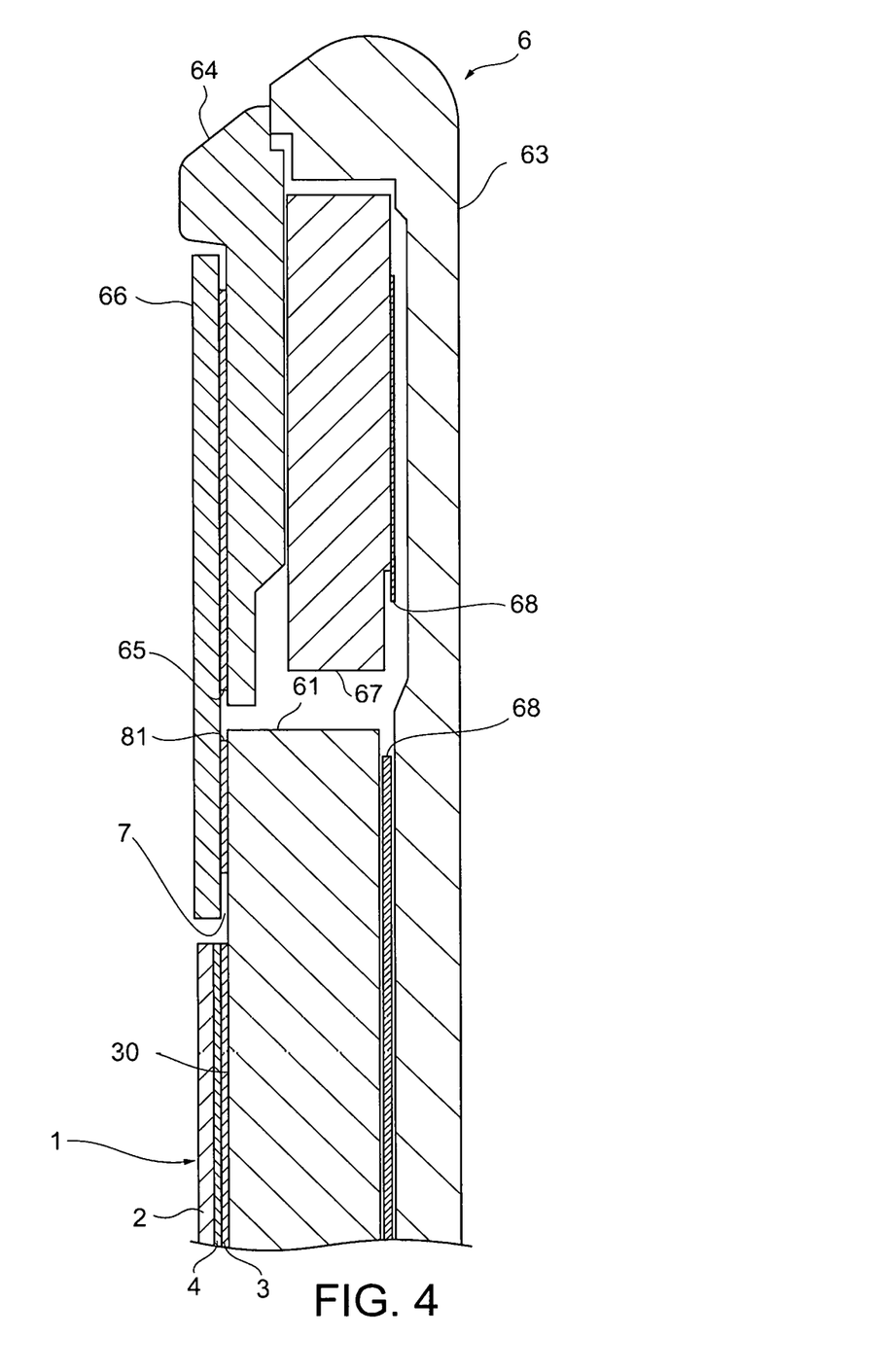
FIG. 4 is a cross-sectional view taken along the line IV-IV of FIG. 2.
Figure 5:
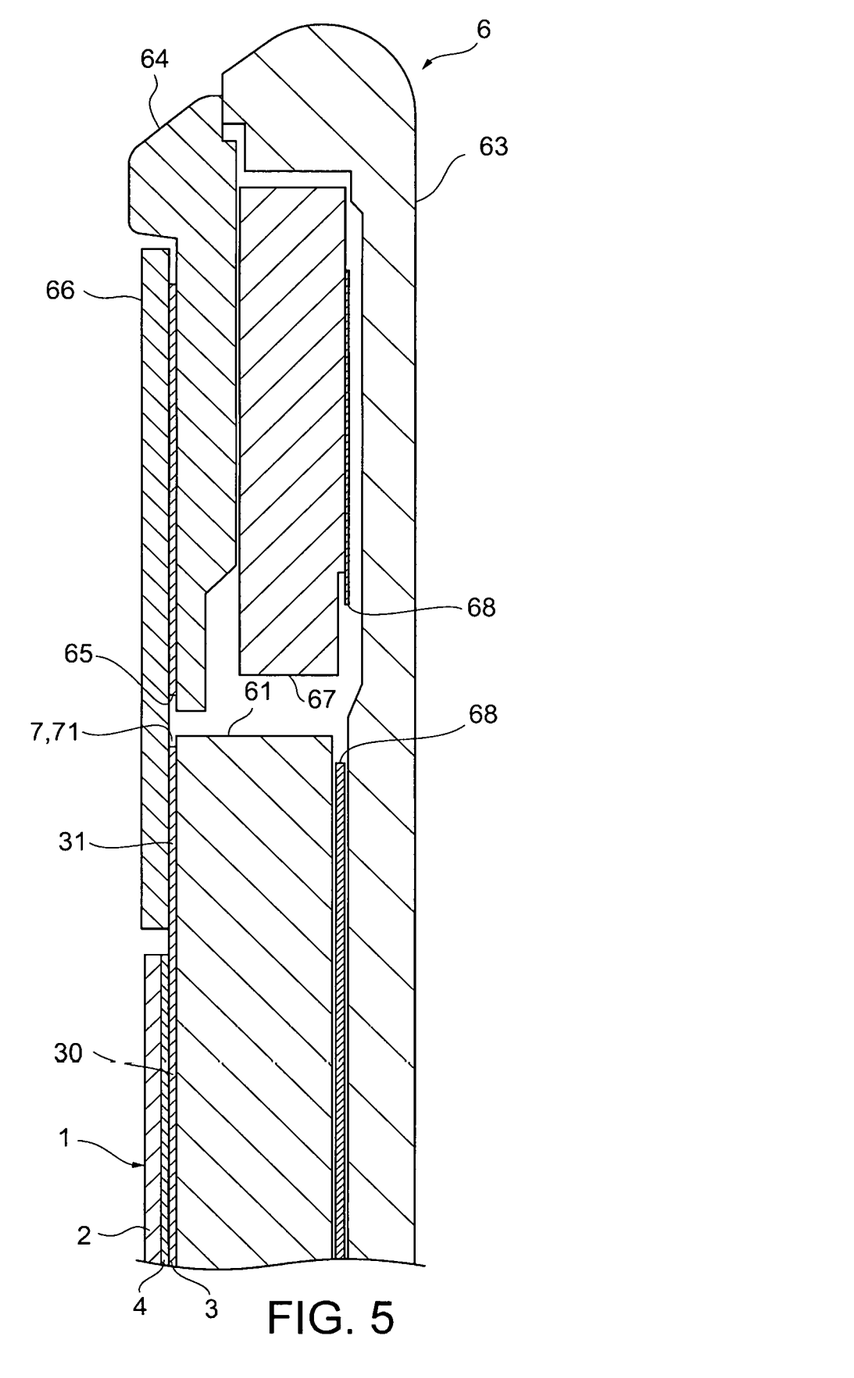
FIG. 5 is a cross-sectional view taken along the line V-V of FIG. 2.

Referring next to FIGS. 3 to 5, the following describes the attachment of the viewing angle changing film 1 to the LCD module 61. FIG. 3 is a front view of the viewing angle changing film 1 and the laptop PC 10, showing the periphery of the lid 6 of the laptop PC 10. FIG. 4 is a cross-sectional view taken along the line IV-IV of FIG. 2. FIG. 5 is a cross-sectional view taken along the line V-V of FIG. 2. To facilitate understanding, FIGS. 4 and 5 show the thicknesses of the attachment film 3 and the optical adhesive 4 slightly larger than their actual dimensions.

As shown in FIG. 4, the lid 6 of the laptop PC 10 includes an A cover 63, a B cover 64 and the bezel 66. The A cover 63, the B cover 64 and the bezel 66 are members to make up the outer shell of the lid 6. The A cover 63 and the B cover 64 are disposed having an interval therebetween, and other components, such as an antenna module 67 and an aluminum sheet 68, are disposed between these covers.

The bezel 66 faces the front face of the B cover 64. As described above, the bezel 66 is a rectangular frame having an opening at the center. The bezel 66 adheres to the B cover 64 via a thin-film like adhesive tape 65.

Between the bezel 66 and the A cover 63, the LCD module 61 is disposed. The LCD module 61 is covered by the bezel 66 at the outer edge. Between the outer edge of the LCD module 61 and the bezel 66, air gap 7 is defined.

As shown in FIG. 3, a set of adhesive sheets 81, 82 is disposed in the air gap 7. The set of adhesive sheets 81, 82 is one example of the adhesive layer. In FIG. 3, the adhesive sheets 81, 82 and the attachments 31, 32 disposed on the rear face of the bezel 66 are shown with broken lines. The adhesive sheets 81 extend along the long sides of the LCD module 61, and the adhesive sheets 82 extend along the short sides of the LCD module 61. The bezel 66 adheres to the outer edge of the LCD module 61 at a set of positions via the adhesive sheets 81, 82.

The set of adhesive sheets 81 are disposed having an interval therebetween. Between the neighboring adhesive sheets 81 and 81, air gap 71 is defined. The air gap 71 is a part between the adhesive sheets 81 and 81 of the air gap 7. The air gap 71 is disposed at a part corresponding to the long side of the LCD module 61. The air gap 71 has a width dimension that is slightly larger than the width dimension of the attachment 31. The interval between the air gaps 71 and 71 is substantially the same as the interval between the attachments 31 and 31.

Similarly, the set of adhesive sheets 82 also are disposed having an interval therebetween. Between the neighboring adhesive sheets 82 and 82, air gap 72 is defined. The air gap 72 is a part between the adhesive sheets 82 and 82 of the air gap 7. The air gap 72 is disposed at a part corresponding to the short side of the LCD module 61. The air gap 72 has a width dimension that is slightly larger than the width dimension of the attachment 32. The interval between the air gaps 72 and 72 is substantially the same as the interval between the attachment 32 and 32.

To attach the viewing angle changing film 1, the attachments 31 are inserted into the air gap 71 as shown in FIGS. 3 and 5. Then the attachments 32 are inserted into the air gap 72. By bending the viewing angle changing film 1, all of the attachments 31, 32 can be inserted into the air gap 71, 72. By returning the bent viewing angle changing film 1 to the original shape, the insertion of the attachments 31, 32 ends.

The attachments 31, 32 inserted into the air gap 71, 72 latch on the bezel 66. This can fix the viewing angle changing film 1 to the laptop PC 10. The base film 2 of the viewing angle changing film 1 is opposed to the LCD module 61 while sandwiching the attachment film 3 and the optical adhesive 4 therebetween.

A user of the laptop PC 10 views the contents displayed on the LCD module 61 through the base film 2, the optical adhesive 4 and the attachment film 3. When the user views the LCD module 61 in the direction along the line N (see FIG. 1) substantially normal to the base film 2, the viewing angle changing film 1 enables easy viewing of the contents displayed on the LCD module 61. Specifically, the user can view the contents displayed on the LCD module 61 without interference in the line of sight by the set of louvers disposed inside of the base film 2. More specifically, the user can view the contents displayed on the LCD module 61 through the gap between the set of louvers.

On the contrary, when the user views the LCD module 61 in the direction tilted from the normal line N by angle $\theta$ or more, i.e., views the LCD module 61 from the outside of the line L in FIG. 1, the louvers of the base film 2 interfere with the line of sight of the user. Specifically, the user sees the base film 2 in black, and so cannot view the contents displayed on the LCD module 61. That is, the viewing angle changing film 1 narrows the viewing angle of the LCD module 61. Such a change in viewing angle can prevent other persons from peeping the displayed contents on the LCD module 61.

Next, the following describes the advantageous effects of the viewing angle changing film 1 and the laptop PC 10.

In one aspect of the viewing angle changing film 1, the attachments 31, 32 are formed as a separate member from the base film 2. Therefore the attachments 31, 32 can be made without complicated forming or processing, such as making a part of the base film 2 thinner.

Figure 6:
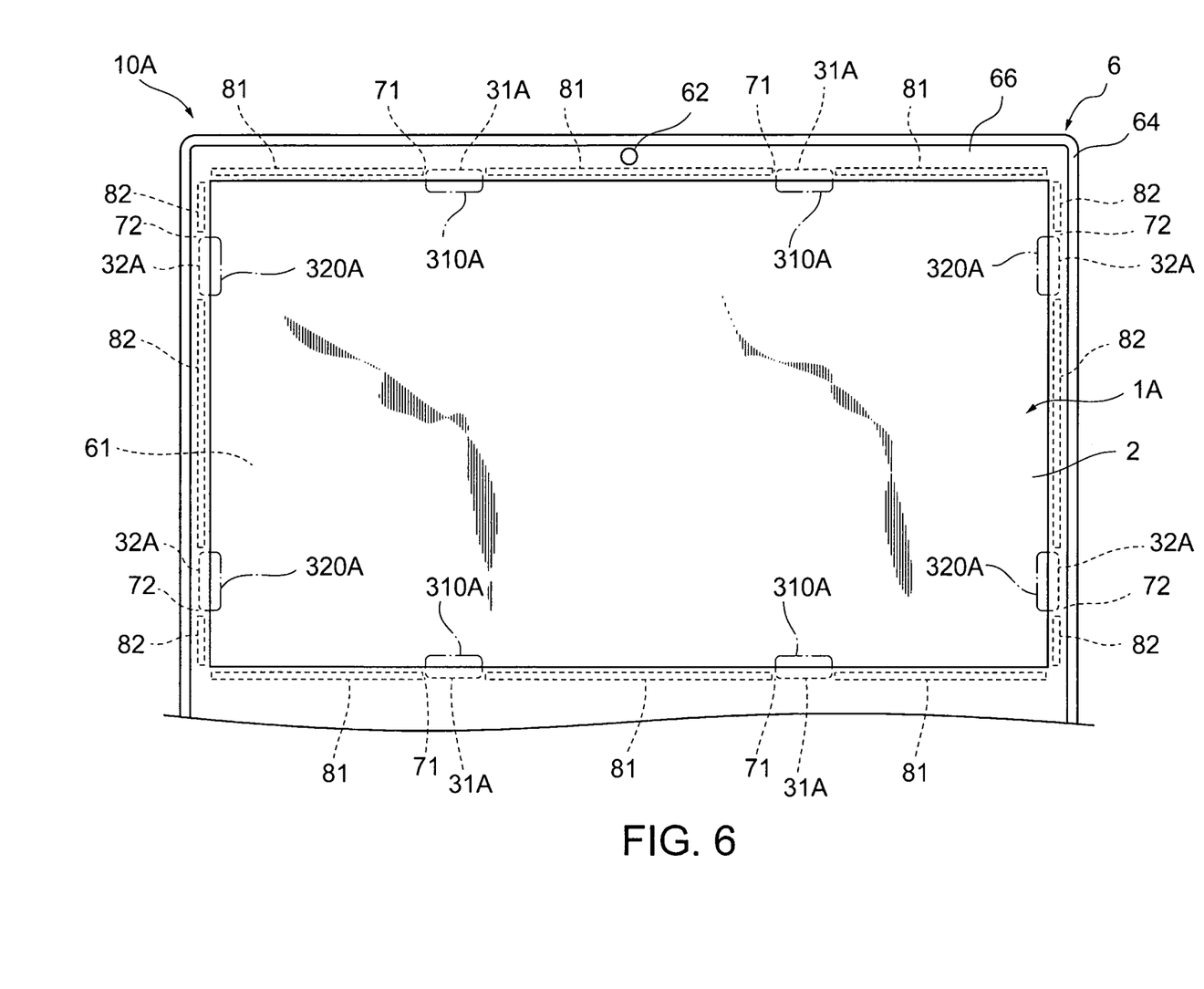
FIG. 6 is a front view of a viewing angle changing film and a laptop PC according to another embodiment for comparison.

Referring now to FIG. 6, the following describes a viewing angle changing film 1A and a laptop PC 10A in another embodiment for comparison. FIG. 6 is a front view of the viewing angle changing film 1A and the laptop PC 10A according to this embodiment for comparison, showing the periphery of the lid 6 of the laptop PC 10A. The same reference numbers are used to refer to the same elements of the viewing angle changing film 1A and the laptop PC 10A as those in the viewing angle changing film 1 and the laptop PC 10 described above, and their description is omitted as appropriate.

The viewing angle changing film 1A includes the attachments 31A and 32A that are different in shape from the attachments 31, 32 as stated above. Specifically unlike the attachments 31, 32, the attachments 31A, 32A are not integrally formed with the rectangular part 3a. The attachments 31A, 32A in this embodiment are mutually independent small pieces. That is, the viewing angle changing film 1A does not have the rectangular part 3a.

The attachments 31A, 32A adhere to the base film 2 at one part and protrude to the outside from the base film 2 at the other part. The other part of the attachments 31A, 32A is inserted into air gap 71, 72 to latch on the bezel 66, which fixes the viewing angle changing film 1A to the laptop PC 10A.

In such a mode as well, the viewing angle changing film 1A can be attached to the laptop PC 10A without complicated forming or processing of the base film 2. However, as indicated with dot-and-dash line 310A, 320A, the user sees the outer shape of the attachments 31A, 32A. Specifically the user sees the outer shape of the part of the attachments 31A, 32A that adheres to the base film 2 through the base film 2. This may degrade the design of the viewing angle changing film 1A and the laptop PC 10A, or may interfere with the user's view of the contents displayed on the LCD module 61. Therefore this configuration has room for improvement.

On the contrary, the viewing angle changing film 1 and the laptop PC 10 according to the first embodiment include the attachment film 3, and this attachment film has a property of transmitting light, has a thickness smaller than that of the base film 2, and has the outer shape larger than the base film 2 in the front view. The base film 2 is stacked on the attachment film 3. The attachment film 3 has the attachments 31, 32 located outside of the end of the base film 2.

According to this mode, the user does not see the outer shape of the members of the attachments 31, 32 via the base film 2. This does not degrade the design of the viewing angle changing film 1 and the laptop PC 10, and does not interfere with the user's view of the contents displayed on the LCD module 61.

The base film 2 substantially as a whole is fixed to the attachment film 3.

This mode can suppress the bending of the base film 2 during the use of the viewing angle changing film 1. This can suppress the interference in the user's view by the bending of the base film 2.

The base film 2 adheres to the attachment film 3 via the optical adhesive 4.

As described above, the optical adhesive 4 transmits visible light. This mode therefore can fix the base film 2 substantially as a whole to the attachment film 3 without interference with user's view on the LCD module 61.

The set of attachments 31, 32 are disposed along the outer edge of the attachment film 3 and these attachments are away from each other.

The attachments 31, 32 in this mode can be inserted into the air gap 71, 72 by bending the viewing angle changing film 1.

The attachment 31, 32 are offset from the center of one side of the attachment film 3.

A camera lens or the like directed to the user is often disposed at the center part of the bezel of an electronic apparatus, such as the laptop PC 10. The attachments 31 are offset from the center of the long sides of the attachment film 3, and therefore the attachments 31 can be inserted into the air gap 71 without interference with the camera lens or the like. When the electronic apparatus does not have such a member that interferes with the attachments 31, the attachments 31 may be disposed at the center of the long side of the rectangular part 3a or the attachments 32 may be disposed at the center of the short side of the rectangular part 3a.

The attachments 31, 32 are disposed at positions corresponding to at least three sides of the attachment film 3.

This mode can fix the viewing angle changing film 1 so as to be opposed to the LCD module 61 without falling, and can suppress floating of the viewing angle changing film 1 from the LCD module 61.

The base film 2 includes the functional film 2b having a property of transmitting light in a predetermined direction only and the surface protective film 2a having a property of transmitting light and covering the functional film 2b.

This mode can change the viewing angle with the functional film 2b and can ensure the rigidity of the base film 2 with the surface protective film 2a.

The base film 2 has the rear-face protective film 2c having a property of transmitting light and sandwiching the functional film 2b with the opposed surface protective film 2a.

This mode can improve the rigidity of the base film 2 without degrading the function of the functional film 2b.

The first embodiment as described above includes the viewing angle changing film 1 that is a separate member of the laptop PC 10. The viewing angle changing film 1 may be one of the components of the laptop PC 10.

Such a mode of the laptop PC 10 has the attachments 31, 32 that are formed as a separate member from the base film 2. Therefore the attachments 31, 32 can be made without complicated forming or processing, such as making a part of the base film 2 thinner.

The bezel 66 adheres to the LCD module 61 via the adhesive sheets 81, 82 disposed at the air gap 7.

This mode can prevent the turning up of the bezel 66 when external force acts thereon, because the adhesive sheets 81, 82 fix the bezel 66 to the LCD module 61. In other words, the air gap 7, which is defined to dispose the adhesive sheets 81, 82, can be used to insert the attachments 31, 32.

The set of adhesive sheets 81, 82 is disposed along the outer edge of the LCD module 61. Each attachment 31 is inserted into the air gap 71 defined between the neighboring adhesive sheets 81 and 81, and each attachment 32 is inserted into the air gap 72 defined between the neighboring adhesive sheets 82 and 82.

This mode can define the air gap 71, 72 to insert the attachments 31, 32 while fixing the bezel 66 to the LCD module 61 with the adhesive sheets 81, 82.

In the first embodiment as stated above, the base film 2 includes the lamination of the surface protective film 2a, the functional film 2b and the rear-face protective film 2c. The present invention is not limited to this mode. In another example of the viewing angle changing film, the lamination of the base film includes the surface protective film 2a and the functional film 2b only, and the base film adheres to the attachment film 3 via the optical adhesive 4.

Figure 7:
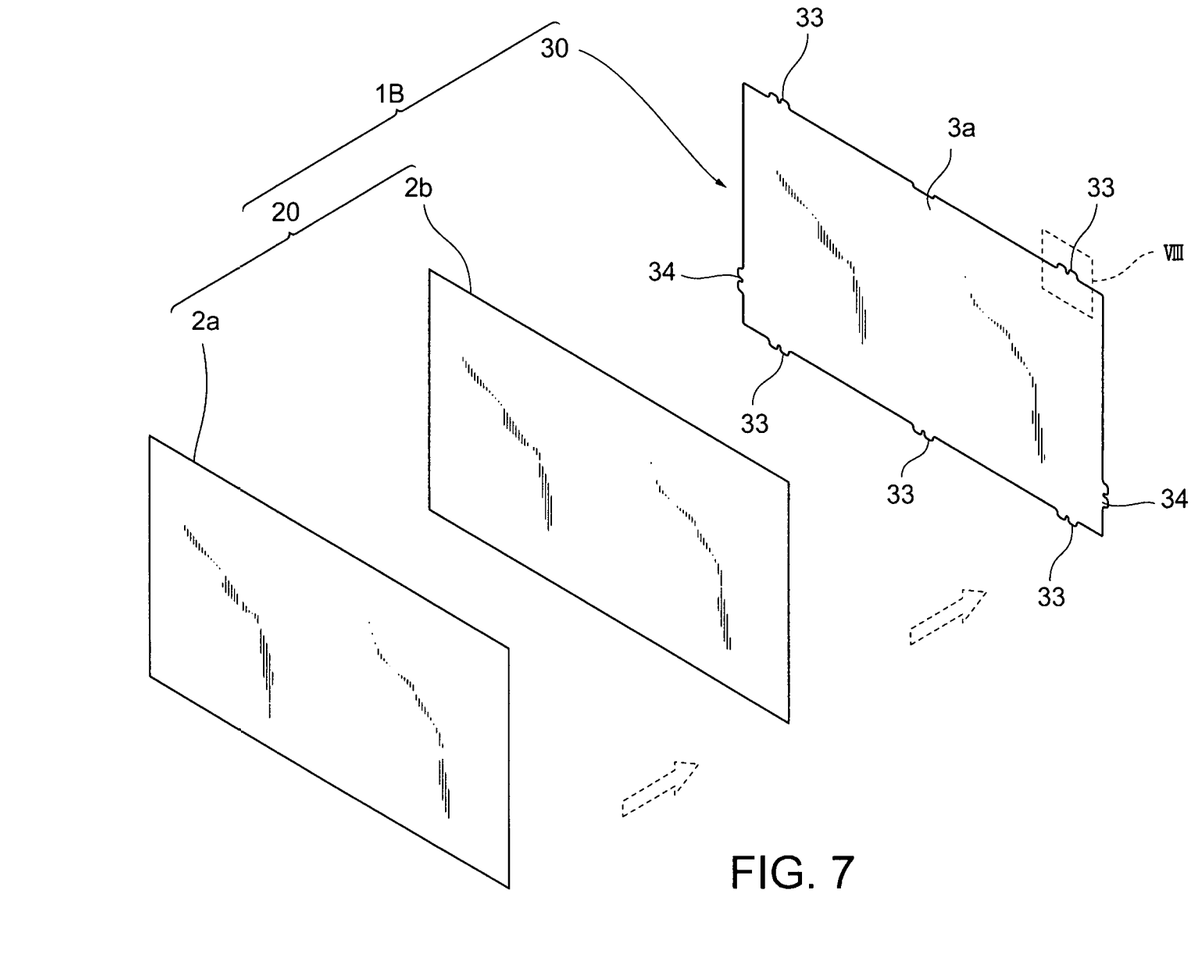
FIG. 7 is an exploded view of a viewing angle changing film according to a second embodiment.
Figure 8:
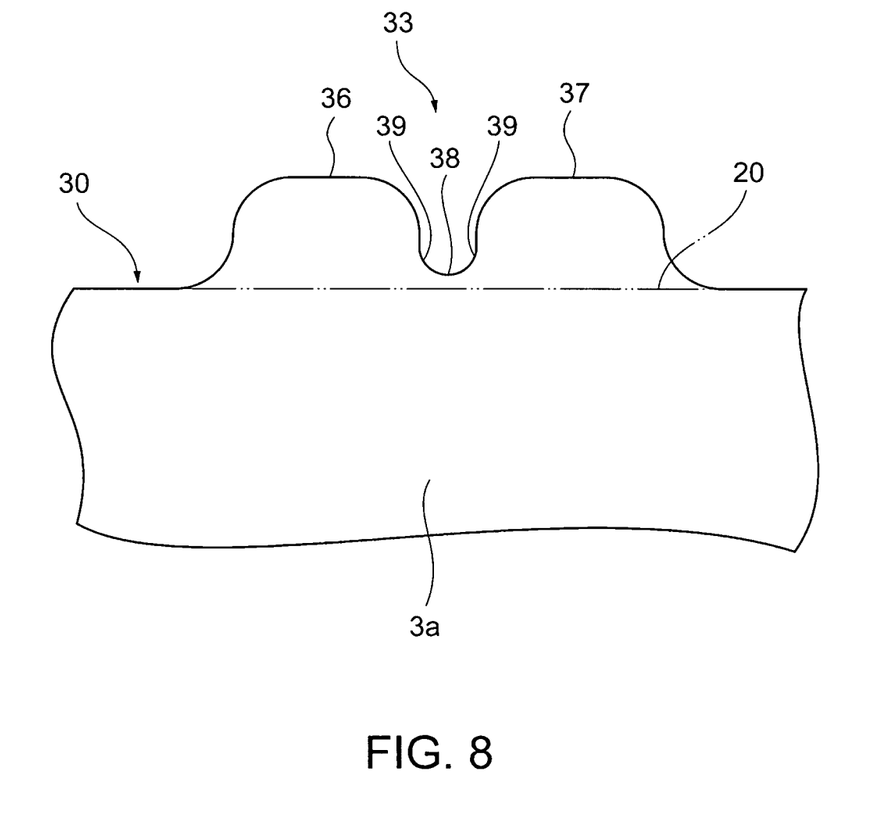
FIG. 8 is an enlarged view of part VIII of FIG. 7.
Figure 9:
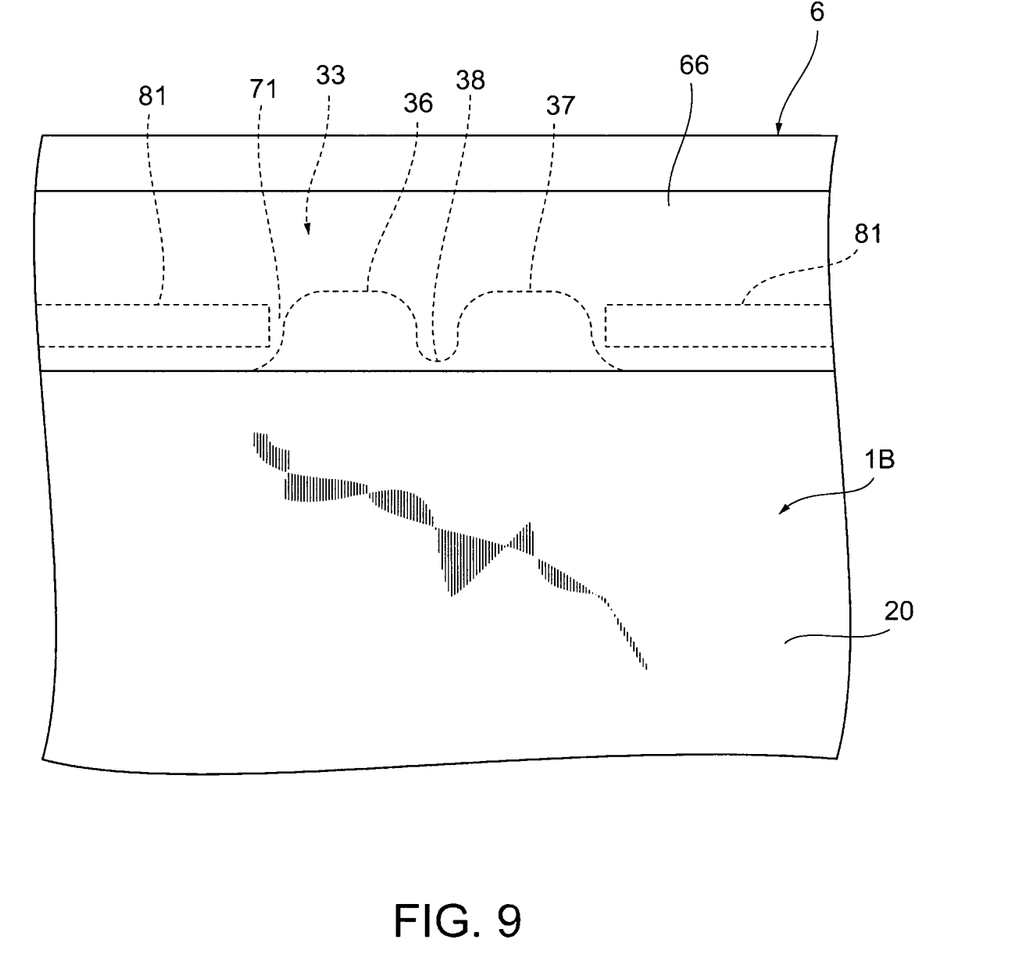
FIG. 9 is a front view of the viewing angle changing film of FIG. 7 and a laptop PC.

Referring to FIGS. 7 to 9, the following describes a viewing angle changing film 1B according to a second embodiment. FIG. 7 is an exploded view of the viewing angle changing film 1B. FIG. 8 is an enlarged view of part VIII of FIG. 7. FIG. 9 is a front view of the viewing angle changing film 1B and a laptop PC. FIG. 9 is a partially enlarged view of the viewing angle changing film 1B and the laptop PC, showing the periphery of an attachment 33 described later.

Similarly to the first embodiment, the viewing angle changing film 1B is applied to a laptop PC. The same reference numbers are used to refer to the same elements of the viewing angle changing film 1B as those in the first embodiment, and their description is omitted.

A base film 20 of the viewing angle changing film 1B includes the lamination of a surface protective film 2a and a functional film 2b. The base film 20 does not include the rear-face protective film 2c (see FIG. 2) unlike the base film 2 of the first embodiment.

The base film 20 is stacked on an attachment film 30. The attachment film 30 faces the surface protective film 2a while sandwiching the functional film 2b therebetween, and adheres to the functional film 2b due to the adhesiveness of the intermediate material as described above. The attachment film 30 has an rectangular part 3a and a set of attachments 33, 34.

The attachments 33, 34 are protrusions disposed at the end of the attachment film 30. The attachment 33, 34 protrude outwardly from the end of the rectangular part 3a. That is, the outer shape of the attachment film 30 is larger than the outer shape of the base film 20 by the attachments 33, 34. Two of the attachments 33 are disposed along one long side of the rectangular part 3a, and three of them are disposed along the other long side of the rectangular part. One attachment 34 is disposed along each short side of the rectangular part 3a. Three or four or more of the attachments 33 may be disposed along the long side of the rectangular part 3a, or two or more of the attachments 34 may be disposed along the short side of the rectangular part 3a.

In this way, unlike the viewing angle changing film 1 of the first embodiment as stated above, the viewing angle changing film 1B does not include the rear-face protective film 2c and the optical adhesive 4 (see FIG. 2). The viewing angle changing film 1B therefore is more advantageous than the viewing angle changing film 1 in terms of slimming and lighter weight.

The viewing angle changing film 1B can be manufactured by preparing the base film beforehand to be larger than the other films by their attachments 33, 34 and stacking the surface protective film 2a, the functional film 2b and the attachment film 30. In another example, the attachment film 30 may be prepared by stacking the surface protective film 2a, the functional film 2b and the attachment film 30 having the same shape, and then removing a part corresponding to the attachments 33, 34 from the surface protective film 2a and the functional film 2b to form the attachments 33, 34.

As shown in FIG. 8, each attachment 33 includes protrusions 36, 37 and a joint 38. One attachment may include three or more of the protrusions. Although not described, the attachment 34 also includes a set of protrusions and a joint to join them.

The protrusions 36, 37 protrude to the outside from the end of the rectangular part 3a. The dashed-two dotted line in FIG. 8 shows the base film 20 stacked on the attachment film 30. The protrusions 36, 37 protrude to the outside from the end of this base film 20. These protrusions 36, 37 are close to each other having a gap (e.g., about 1 mm) therebetween.

The joint 38 is disposed at the gap between the protrusions 36 and 37 to join them. Specifically the joint 38 is closer to the base film 20 than the leading ends of the protrusions 36, 37 and is on the outside of the end of this base film 20 so as to join the protrusions across the gap. The joint 38 is curved, and has a substantially U-shaped edge. The joint 38 has ends 39 to join with the protrusions 36, 37, and the ends are wider than the other part of the joint 38. That is, the joint 38 has a cross section that gradually changes between the protrusions 36 and 37.

Similarly to the laptop PC 10 of the first embodiment, the laptop PC to attach the viewing angle changing film 1B also has air gap 71, 72 formed at the positions corresponding to the attachments 33, 34. To attach the viewing angle changing film 1B to the laptop PC, the attachments 33 are inserted into the air gap 71 as shown in FIG. 9. Then the attachments 34 are inserted into the air gap 72 (see FIG. 3). By bending the viewing angle changing film 1B, all of the attachments 33, 34 can be inserted into the air gap 71, 72. By returning the bent viewing angle changing film 1B to the original shape, the insertion of the attachments 33, 34 ends, so that the attachments 33, 34 latch on the bezel 66.

Each attachment 33 latches on the bezel 66 at the protrusions 36, 37 as well as at the joint 38. Such latching on the bezel 66 in a wider range is effective to reliably fix the viewing angle changing film 1B to the laptop PC. To this end, the attachments 33 preferably have a sufficient size to fix the viewing angle changing film 1B.

When removing the viewing angle changing film 1B from the laptop PC, a user places their fingers on the end of the rectangular part 3a to apply a force to remove the viewing angle changing film from the LCD module 61 (see FIG. 1). When relatively large attachments 33 are used, a pulling force may act on the attachment 33 from the bezel 66 and the rectangular part 3a when the attachment 33 is ejected from the air gap 71 by the force applied by the user.

Since the attachment 33 includes the protrusions 36, 37, one of the protrusions 36, 37 can be deformed flexibly relative to the other when such a pulling force acts on the attachment. Additionally the joint 38 has the wider and curved ends 39 to join with the protrusions 36, 37, stress does not concentrate on between the protrusions 36, 37 and the joint 38. This can prevent a breakage of the attachments 33 when removing the viewing angle changing film 1B from the laptop PC. The attachments 34 having a similar configuration to the attachments 33 have similar advantageous effects.

In this second embodiment, the base film 20 includes the lamination of the surface protective film 2a and the functional film 2b. The present invention is not limited to this mode. For instance, similarly to the first embodiment, the base film 20 may include the rear-face protective film 2c (see FIG. 2).

As described in the other embodiment for comparison of the first embodiment (see FIG. 6), the second embodiment also may be configured so that the viewing angle changing film 1B does not have a rectangular part 3a and includes mutually independent attachments 33, 34, and these attachments adhere to the base film 20.

As has been described, the present invention provides an improved viewing angle changing film.

While the invention has been particularly shown and described with reference to a preferred embodiment, it will be understood by those skilled in the art that various changes in form and detail may be made therein without departing from the spirit and scope of the invention.

What is claimed is:

1. A protective film comprising:
a base film changes a viewing angle of a display panel on which said protective film is placed; and
a flat attachment film, which is fixed to said base film, includes a plurality of attachements inserted into an air gap defined between said display panel and a bezel covering an outer edge of said display panel, wherein said plurality of attachments are thinner than said base film.

2. The protective film of claim 1, wherein said attachment film transmits light, and is thinner than said base film, and has an outer shape larger than said base film.

3. The protective film of claim 1, wherein said attachment film has an attachment on an outside of an end of said base film.

4. The protective film of claim 1, wherein said base film adheres to said attachment film via an optical adhesive.

5. The protective film of claim 1, wherein one of said attachments has a plurality of protrusions protruding to an outside from an end of said base film.

6. The protective film of claim 5, wherein said one attachment has a joint to join said plurality of protrusions at a position closer to said base film than leading ends of said plurality of protrusions.

7. The protective film of claim 6, wherein said joint is curved to be wider at ends joining with said plurality of protrusions.

8. The protective film of claim 1, wherein a plurality of base film attachments are disposed along an outer edge of said base film and are away from each other.

9. The protective film of claim 8, wherein said base film attachments are offset from a center of one side of said base film.

10. The protective film of claim 8, wherein said base film attachments are disposed at positions corresponding to at least three sides of said base film.

11. The protective film of claim 1, wherein said base film includes a functional film for transmitting light in a predetermined direction only and a surface viewing angle changing film for transmitting light and covering said functional film.

12. The protective film of claim 11, wherein said base film has a rear-face viewing angle changing film for transmitting light and facing said surface viewing angle changing film while sandwiching said functional film therebetween.

13. An electronic apparatus, comprising:
a display panel;
a bezel surrounding an outer edge of said display panel; and
a protective film having
a base film for changing a viewing angle of said display panel on which said protective film is placed; and
a flat attachment film, which is fixed to said base film, includes a plurality of attachements inserted into an air gap defined between said display panel and a bezel covering an outer edge of said display panel, wherein said plurality of attachments are thinner than said base film.

14. The electronic apparatus of claim 13, wherein said bezel adheres to said display panel via an adhesive layer disposed at said air gap.

15. The electronic apparatus of claim 14, wherein a plurality of adhesive layers is disposed along an outer edge of said display panel, and one of said attachments is inserted into an air gap defined between neighboring adhesive layers.

* * * * *